United States Patent
Ho

(10) Patent No.: US 8,937,635 B2
(45) Date of Patent: Jan. 20, 2015

(54) DEVICE, METHOD AND SYSTEM FOR REAL-TIME SCREEN INTERACTION IN VIDEO COMMUNICATION

(75) Inventor: Shun-Lung Ho, Taipei (TW)

(73) Assignee: Egalax_Empia Technology Inc., Taipei (TW)

( * ) Notice: Subject to any disclaimer, the term of this patent is extended or adjusted under 35 U.S.C. 154(b) by 406 days.

(21) Appl. No.: 13/303,439

(22) Filed: Nov. 23, 2011

(65) Prior Publication Data

US 2013/0093834 A1    Apr. 18, 2013

(30) Foreign Application Priority Data

Oct. 12, 2011  (TW) .............................. 100136844 A

(51) Int. Cl.
*H04N 7/14* (2006.01)
*H04L 29/06* (2006.01)

(52) U.S. Cl.
CPC ............ *H04L 65/4015* (2013.01); *H04N 7/147* (2013.01); *H04L 65/1089* (2013.01)
USPC ..................................... 348/14.03; 348/14.02

(58) Field of Classification Search
CPC ....... H04L 65/4015; H04N 7/14; H04N 7/147
USPC ...................... 348/14.08, 14.01, 14.02, 14.03
See application file for complete search history.

(56) References Cited

U.S. PATENT DOCUMENTS 8,125,510 B2 *   2/2012   Agarwal et al. ............ 348/14.08
2008/0184124 A1  7/2008   Agarwal et al.

* cited by examiner

*Primary Examiner* — Olisa Anwah
(74) *Attorney, Agent, or Firm* — WPAT, PC; Justin King

(57) ABSTRACT

The present invention discloses a communication apparatus for real-time screen interaction in video communications, which includes: a video output conversion device for generating a first video stream based on a sound input and a video input; a communication device for transmitting the first video stream and receiving a second video stream;

a sound retrieving module for providing a first sound signal as the sound input; an input interface for receiving a user operation to generate at least one operation instruction; a processor for generating a screen image based on the second video stream and/or at least one operation instruction; and a switching device for selecting one of an image pickup device and an image retrieving device to provide the video input based on the at least one operation instruction.

12 Claims, 4 Drawing Sheets

DEVICE, METHOD AND SYSTEM FOR REAL-TIME SCREEN INTERACTION IN VIDEO COMMUNICATION

BACKGROUND OF THE INVENTION

1. Field of the Invention

The present invention relates to video communications, and more particularly, to a device, method and system for real-time screen interaction in video communications.

2. Description of the Prior Art

With the development of 3 G communications, people's lives are becoming more convenient. For example, long-distance video communications have enabled users to see and communicate with each other using communication devices via communication systems that provide the transmission of images/sounds. "Communication" is thus no longer based solely on voices, but also on images with which communications are enriched as communicating parties can now see facial expressions of one another.

Although video communications allow communicating parties to communicate like in a face-to-face conversation by transmitting both images and sounds at the same time, but the functions provided by current video communications are not sufficient enough when communicating parties have to discuss and modify over the same document. For example, in video communications, when A wishes to tell B how to get to a destination on a map, A can only point to the map while being video recorded and transmitted to B. A cannot indicate to B the designated path in real time using an electronic map (or a map image). As another example, when A and B wish to complete a task together by video communications, they cannot edit the same document (e.g. an electronic document) at the same time.

In view of the shortcomings of current video communications, the present invention provides a device, method and system for real-time screen interaction in video communications that improves traditional video communications.

SUMMARY OF THE INVENTION

One objective of the present invention is to increase information communication between communicating parties in video communications by real-time interaction of the screens.

The present invention discloses a communication apparatus for real-time screen interaction in video communications, comprising: a video communication module including: a video output conversion device for generating a first video stream based on a sound input and a video input; and a communication device for transmitting the first video stream and receiving a second video stream; a sound retrieving module for providing a first sound signal as the sound input; an input interface for receiving a user operation to generate at least one operation instruction; a processor for generating a screen image based on the second video stream and/or at least one operation instruction; and an image retrieving module, including: an image pickup device for providing the video input by picking up images; an image retrieving device for providing the video input based on the screen image; and a switching device for selecting one of the image pickup device and the image retrieving device to provide the video input based on the at least one operation instruction.

In said communication apparatus, the processor executes an application and generates the screen image based on the at least one operation instruction.

In said communication apparatus, the sound retrieving module includes a microphone and the processor generates a second sound signal to a speaker based on the second video stream.

In said communication apparatus, the input interface includes a touch screen and the screen image is displayed on the touch screen.

The present invention discloses a communication method for real-time screen interaction in video communications, comprising: generating a first video stream based on a sound input and a video input; transmitting the first video stream and receiving a second video stream; providing a first sound signal as the sound input; receiving a user operation to generate at least one operation instruction;

generating a screen image based on the second video stream and/or at least one operation instruction; and selecting an image taken by an image pickup device or the screen image as the video input based on the at least one operation instruction.

In said communication method, the screen image is generated by a processor executing an application and based on the at least one operation instruction.

In said communication method, the first sound signal sound is retrieved by a microphone and a processor generates a second sound signal to a speaker based on the second video stream.

In said communication method, the user operates an input interface to generate the at least one operation instruction, the input interface includes a touch screen and the screen image is displayed on the touch screen.

The present invention discloses a communication system for real-time screen interaction in video communications, comprising: a communication network for providing transmission of a first video stream and a second video stream; a first communication apparatus including: a first video communication module including: a first video output conversion device for generating the first video stream based on a first sound input and a first video input; and a first communication device for transmitting the first video stream and receiving the second video stream via the communication network; a first sound retrieving module for providing a first sound signal as the first sound input; a first input interface for receiving a user operation to generate at least one operation instruction; a first processor for generating a first screen image based on the second video stream and/or at least one operation instruction; and a first image retrieving module, including: an image pickup device for providing the first video input by picking up images; an image retrieving device for providing the first video input based on the first screen image; and a switching device for selecting one of the image pickup device and the image retrieving device to provide the first video input based on the at least one operation instruction; and a second communication apparatus including: a second video communication module including: a second video output conversion device for generating the second video stream based on a second sound input and a second video input; and a second communication device for transmitting the second video stream and receiving the first video stream via the communication network; a second sound retrieving module for providing a second sound signal as the second sound input; a second processor for generating a second screen image based on the first video stream; and a second image retrieving module for providing the second video input by picking up images.

In said communication system, the first processor executes an application and generates the first screen image based on the at least one operation instruction.

In said communication system, the first sound retrieving module includes a first microphone and the first processor generates a third sound signal to a first speaker based on the second video stream, the second sound retrieving module includes a second microphone and the second processor generates a fourth sound signal to a second speaker based on the first video stream In said communication system, the first input interface includes a touch screen and the first screen image is displayed on the touch screen.

The present invention discloses a method for real-time screen interaction in video communications, comprising: switching a first video data path to a second video data path; retrieving a first operation display data on a first screen as a first interaction data by the second video data path; converting the first interaction data into a first video communication signal; and sending out the first video communication signal to display the first operation display data on a second screen in a video communication.

In said method, the first screen includes a first touch screen.

Said method further comprises adding synchronization information into the first video communication signal and/or the second video communication signal, wherein the first operation display data and/or the second operation display data are displayed according to the synchronization information.

Said method further comprises: switching a third video data path to a fourth video data path; retrieving a second operation display data on the second screen as a second interaction data by the fourth video data path, wherein the second operation display data includes the first operation display data; converting the second interaction data into a second video communication signal; and sending out the second video communication signal to display the second operation display data on the first screen in the video communication.

In said method, the second screen includes a second touch screen.

The present invention discloses a device for real-time screen interaction in video communications, comprising: a processor for retrieving an operation display data on a screen as an interaction data, and converting the interaction data into a video communication signal for sending out such that the operation display data is displayed on another screen in a video communication.

In said device, the processor includes a switch for switching between a first video data path and a second video data path, wherein the processor retrieves the operation display data by the second video data path.

In said device, the screen includes a touch screen.

Said device further comprises a control device for pre-processing the operation display data.

Said device further comprises g an interface device for connecting a microphone and a speaker to the processor.

Said device further comprises a transceiver device, wherein the processor sends out the video communication signal by the transceiver device.

The present invention discloses a system for real-time screen interaction in video communications, comprising: a first communication apparatus including: a first screen; a first processor for retrieving a first operation display data on a first screen as a first interaction data and converting the first interaction data into a first video communication signal; and a first transceiver device for sending out the first video communication signal to display the first operation display data on a second screen in a video communication; and a second communication apparatus including: a second screen; a second processor for retrieving a second operation display data on a second screen as a second interaction data and converting the second interaction data into a second video communication signal, wherein the second operation display data includes the first operation display data; and a second transceiver device for sending out the second video communication signal to display the second operation display data on the first screen in the video communication.

In said system, the first processor includes a first switch for switching between a first video data path and a second video data path, wherein the first processor retrieves the first operation display data by the second video data path, the second processor includes a second switch for switching between a third video data path and a fourth video data path, wherein the second processor retrieves the second operation display data by the fourth video data path In said system, the first screen includes a first touch screen, and the second screen includes a second touch screen.

In said system, the first communication apparatus includes a first control device for pre-processing the first operation display data, and the second communication apparatus includes a second control device for pre-processing the second operation display data.

In said system, the first communication apparatus includes a first interface device for connecting a first microphone and a first speaker to the first processor, the second communication apparatus includes a second interface device for connecting a second microphone and a second speaker to the second processor In said system, the first video communication signal and/or the second video communication signal, include synchronization information, wherein the first operation display data and/or the second operation display data are displayed according to the synchronization information.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
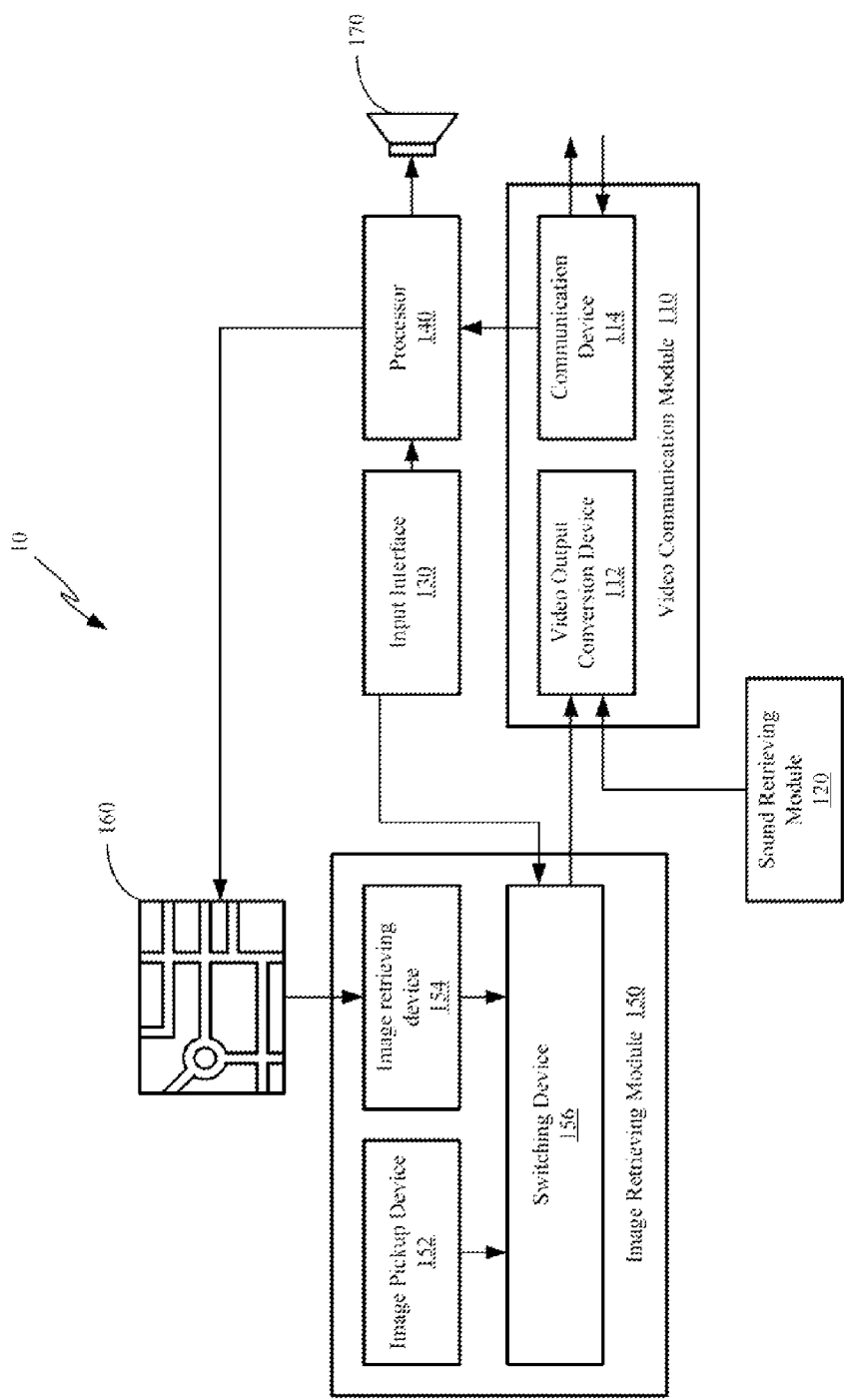
FIG. 1 is a block diagram illustrating an apparatus according to a preferred embodiment of the present invention.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Referring to FIG. 1, a block diagram illustrating an apparatus 10 for real-time screen interaction in video communication according to a preferred embodiment of the present invention is shown. The apparatus allows B to see the operations A made on a screen in real time during video communications. A video communication module 110 receives a sound input and a video input, and outputs a first video stream, wherein the video communication module 110 includes a video output conversion device 112 and a communication device 114. The video output conversion device 112 generates the first video stream based on the sound input and the video input. The communication device 114 transmits the first video stream and receives a second video stream (from the signal of the other party in the video communications, which will be discussed later). A sound retrieving module 120 provides a first sound signal that will become the sound input, wherein the sound retrieving module 120 includes a microphone.

An input interface 130 receives a user operation and generates at least one operation instruction. A processor 140 generates a screen image on a screen 160 based on the second video stream and/or the at least one operation instruction. An image retrieving module 150 provides the video input. The image retrieving module 150 includes an image pickup device 152, an image retrieving device 154 and a switching device 156. The image pickup device 152 provides the video input by picking up images. In this embodiment, it may include a camera of a normal video communication device. The image retrieving device 154 provides the video input based on the screen image, that is, retrieves the screen image and transfers it to the video communication module 110 for processing. The switching device 156 selects the image pickup device 152 or the image retrieving device 154 to provide the video input based on the at least one operation instruction. In addition, the processor 140 generates a second sound signal to a speaker 170 based on the second video stream.

In this embodiment, the processor 140 executes an application and generates the screen image based on the at least one operation instruction. For example, when A and B are in video communication, A generates an operation instruction via the input interface 130 such that the processor 140 executes the application, which allows the video input source to be changed from the image pickup device 152 to the image retrieving device 154 via the switching device 156. Thus, what B sees on the screen is no longer the image picked up by the image pickup device 152 of A, but the image of the screen of A retrieved by the image retrieving device 154 of A. As a result, when A operates and changes the display on the screen, B can see this change in real time. If A did not actuate this application, A and B can carry out normal video communications.

Moreover, in this embodiment, the input interface 130 may include a touch screen, that is, the input interface 130 can be the screen 160, and the screen image is displayed on this touch screen. The touch screen can be a combination of a touch panel and a display. The touch panel or touch screen can be resistive, capacitive, surface acoustic wave, infrared, or optical. However, the types of touch panels applicable to the present invention are not limited to those mentioned above.

Referring back to FIG. 1, based on the operations of the apparatus 10 of the preferred embodiment, the present invention also provides a method for real-time screen interaction in video communications. The method includes: the video output conversion device 112 generating the first video stream based on the sound input and the video input; the communication device 114 transmitting the first video stream and receiving the second video stream; the sound retrieving module 120 providing the first sound signal as the sound input, wherein the sound retrieving module 120 includes a microphone; the input interface 130 receiving an user operation and generating at least one operation instruction; the processor 140 generating the screen image based on the second video stream and/or the at least one operation instruction; and the switching device 156 selecting the images picked by the image pickup device 152 or the screen image (the image on the screen 160 retrieved by the image retrieving device 154) as the video input based on the at least one operation instruction. In an example of the present invention, the sound input can be played by the processor 140 based on the operation instruction, and when the sound input is played, it is output from the speaker 170 simultaneously.

In the above method, the screen image is generated from the processor 140 executing an application based on the at least one operation instruction. The processor 140 generates the second sound signal based on the second video stream and passes it to the speaker 170. In this embodiment, a user may input the at least one operation instruction by operating on the input interface 130, and the input interface 130 may include a touch screen, and the screen image is displayed on this touch screen.

Figure 2:
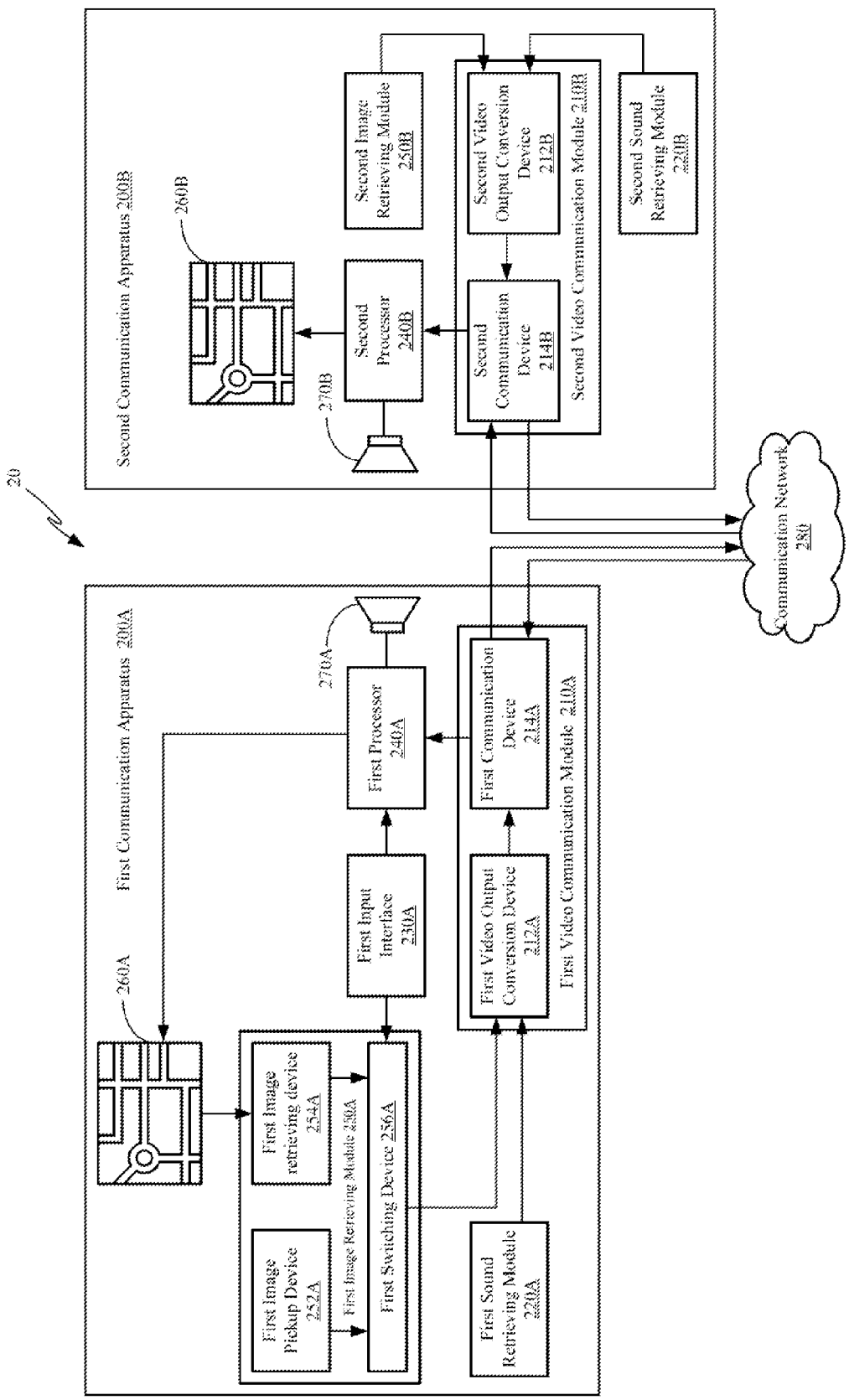
FIG. 2 is a block diagram illustrating a system according to a preferred embodiment of the present invention.

Referring to FIG. 2, a block diagram illustrating a system 20 for real-time screen interaction in video communications according to a preferred embodiment of the present invention is shown. The system allows B to see the operations A made on a screen in real time during video communications. A communication network 280 provides transmissions of a first video stream and a second video stream. A first communication apparatus 200A and a second communication apparatus 200B are in video communications. A first video communication module 210A receives a first sound input and a first video input, and outputs the first video stream. The first video communication module 210A includes a first video output conversion device 212A and a first communication device 214A. The first video output conversion device 212A generates the first video stream based on the first sound input and the first video input. The first communication device 214A transmits the first video stream and receives a second video stream via the communication network 280. A first sound retrieving module 220A provides a first sound signal as the first sound input, wherein the first sound retrieving module 220A includes a first microphone.

A first input interface 230A receives a user operation and generates at least one operation instruction. A first processor 240A generates a first screen image on a first screen 260A based on the second video stream and/or the at least one operation instruction. A first image retrieving module 250A provides the first video input. The first image retrieving module 250A includes a first image pickup device 252A, a first image retrieving device 254A and a first switching device 256A. The first image pickup device 252A provides the first video input by picking up images. In this embodiment, it may include a camera of a normal video communication device. The first image retrieving device 254A provides the first video input based on the first screen image, that is, retrieves the first screen image and transfers it to the first video communication module 210A for processing. The first switching device 256A selects the first image pickup device 252A or the first image retrieving device 254A to provide the first video input based on the at least one operation instruction. In addition, the first processor 240A generates a third sound signal to a first speaker 270A based on the second video stream. In this embodiment, the first input interface 230A may also include a touch screen, that is, the first input interface 230A can be the first screen 260A and the first screen image is displayed on the touch screen.

A second video communication module 210B receives a second sound input and a second video input, and outputs the second video stream. The second video communication module 210B includes a second video output conversion device 212B and a second communication device 214B. The second video output conversion device 212B generates the second video stream based on the second sound input and the second video input. The second communication device 214B transmits and receives the second video stream and the first video stream via the communication network 280. A second sound retrieving module 220B provides a second sound signal as the second sound input, wherein the second sound retrieving module 220B includes a second microphone.

A second processor 240B generates a second screen image on a second screen 260B based on the first video stream. When the first video input source of the first video stream is provided from the first image retrieving device 254A, then the second screen image is the same as the first image screen. Thus, when the screen image displayed on the first screen 260A changes, the screen image displayed on the second screen 260B will change accordingly. In addition, the second communication apparatus 200B also includes a second image retrieving module 250B, which provides the second video input by picking up images. The second processor 240B also generates a fourth sound signal to a second speaker 270B based on the second video stream.

Figure 3:
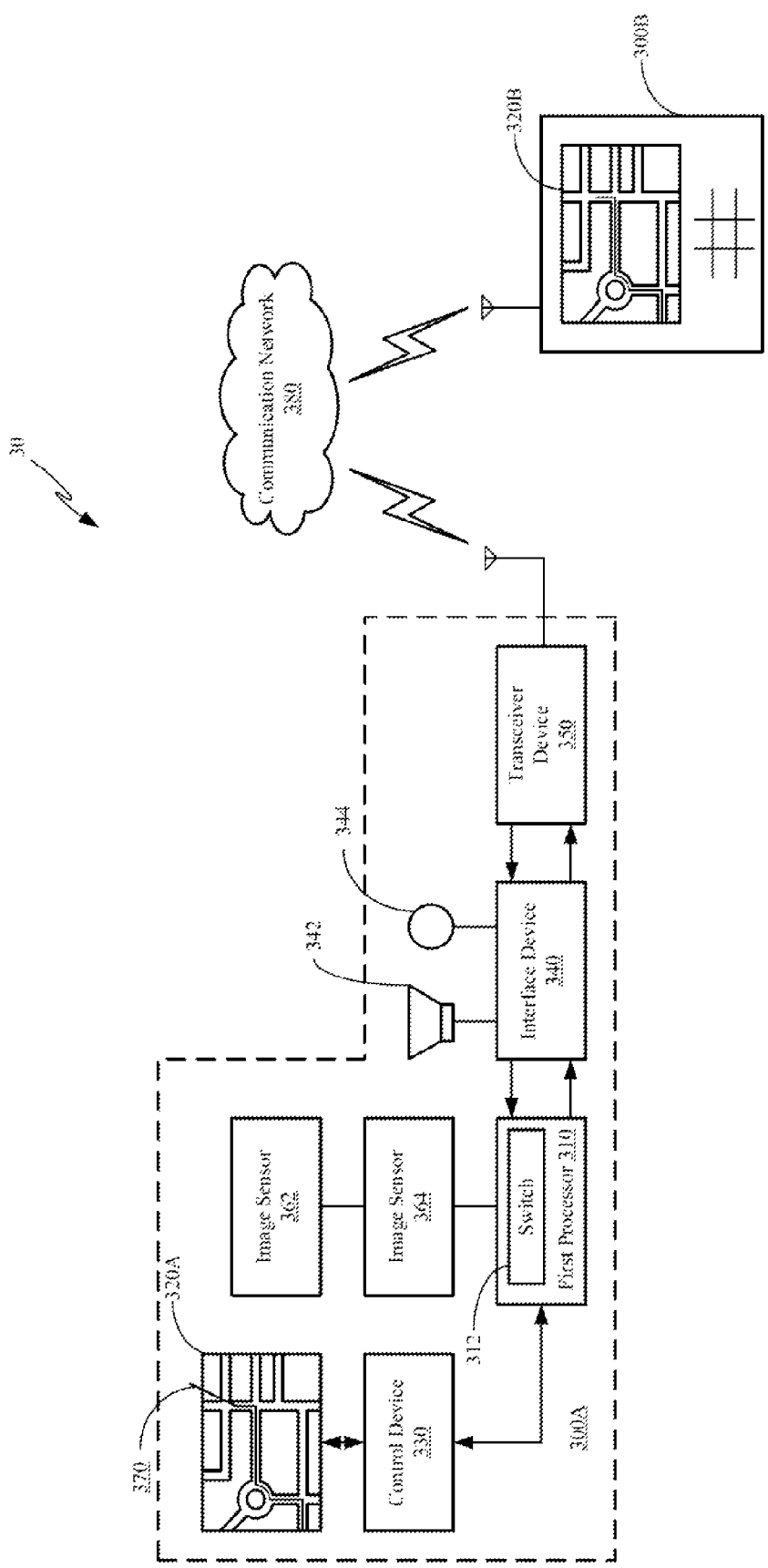
FIG. 3 is a block diagram illustrating an apparatus according to another preferred embodiment of the present invention.

Referring to FIG. 3, a block diagram illustrating a preferred embodiment 30 of the present invention is shown. A first communication apparatus 300A and a second communication apparatus 300B are carrying out a video communication of the present invention via a communication network 380. A processor 310 retrieves an operation display data on a screen 320A as an interaction data, and converts this interaction data into a video communication signal to be sent out of the first communication apparatus 300A. As a result, another screen 320B in this video communication displays the operation display data. The operation display data may be track traces, pictures or other visual information.

In the above, the processor 310 includes a switch 312 for switching between a first video data path (an image pickup path via a normal video communication device, such as image sensor 362 and image sensor 364) and a second video data path (a path that retrieves the operation display data on the screen 320A), wherein the processor retrieves operation display data via the second video data path. In this embodiment, the screen 320A can be a touch screen, and a control device 330 pre-processes the operation display data (e.g. processing of touch signal, determination of the touch location and the response of touch screen image etc.). In addition, the first communication apparatus 300A also includes an interface device 340 for connecting a microphone 344 and a speaker 342 to the processor 310; and further includes a transceiver 350 for sending out the video communication signals generated by the processor 310.

In this embodiment, the first communication apparatus 300A switches from the first video data path (via the image sensor 362 and the image sensor 364) to the second video data path (retrieving the operation display data on the screen 320A) by the switch 312, so the image displayed on the screen 320B of the second communication apparatus 300B is no longer the image taken by the image sensor 362, but the image on the screen 320A retrieved by the processor 310. Thus, when the display on the screen 320A changes, the display on the screen 320B will also change accordingly. For example, in the case of a touch pen 370 drawing a traveling route on an electronic map displayed on the screen 320A, the screen 320B displays the electronic map and the traveling route in real-time.

Figure 4:
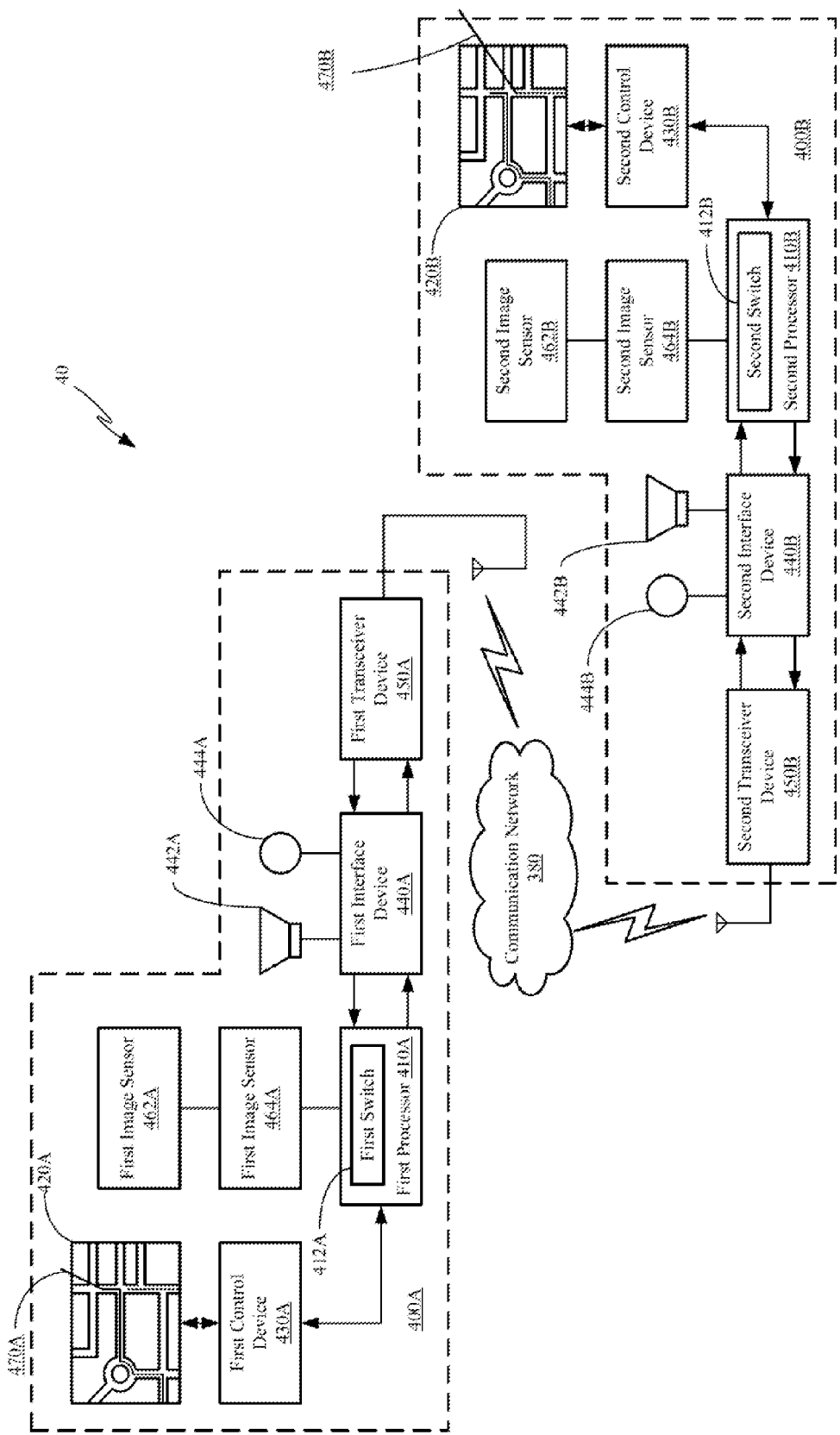
FIG. 4 is a block diagram illustrating a system according to another preferred embodiment of the present invention.

Referring to FIG. 4, a block diagram illustrating another preferred embodiment 40 of the present invention is shown. A first communication apparatus 400A and a second communication apparatus 400B are carrying out a video communication of the present invention via a communication network 380. A first processor 410A retrieves a first operation display data on a first screen 420A as a first interaction data, and converts this first interaction data into a first video communication signal. A first transceiver device 450A sends out the first video communication signal, thereby a second screen 420B of the second communication apparatus 400B in the video communications displaying the first operation display data. A second processor 410B retrieves a second operation display data on a second screen 420B as a second interaction data, and converts this second interaction data into a second video communication signal, wherein the second operation display data includes the first operation display data. A second transceiver device 450B sends out the second video communication signal, thereby the first screen 420A of the first communication apparatus 400B in the video communications displaying the second operation display data.

The first processor 410A includes a first switch 412A for switching between a first video data path (via a first image sensor 462A and a first image sensor 464A) and a second video data path (retrieving the operation display data on the first screen 420A), wherein the first processor 410A retrieves the first operation display data via the second video data path. The second processor 410B includes a second switch 412B for switching between a third video data path (via a second image sensor 462B and a second image sensor 464B) and a fourth video data path (retrieving the operation display data on the second screen 420B), wherein the second processor 410B retrieves the second operation display data via the fourth video data path. In this embodiment, the first screen 420A can be a first touch screen, the second screen 420B can be a second touch screen, and a first and second control device 430A and 430B pre-process the first and second operation display data (e.g. processing of touch signal, determination of the touch location and the response of touch screen image etc.), respectively. In addition, the first and second communication apparatuses 400A and 400B also includes a first and a second interface device 440A and 440B for connecting a first and a second microphone 444A and 444B and a first and a second speaker 442A and 442B to the first and second processors 410A and 410B, respectively; and further include a first and a second transceiver 450A and 450B for sending out the video communication signals generated by the first and second processors 410A and 410B, respectively.

In this embodiment, both communicating parties can adopt the techniques of the present invention, so the change in the display on the first screen 420A can be displayed in real-time on the second screen 420B, and the change in the display on the second screen 420B can be displayed in real-time on the first screen 420A. For example, in the case of a first touch pen 470A drawing a first traveling route (e.g. the solid line on the first screen 420A) on an electronic map displayed on the first screen 420A, the second screen 420B displays the electronic map and the first traveling route (e.g. the solid line on the second screen 420B) in real-time; meanwhile, a second touch pen 470B is drawing a second traveling route (e.g. the dotted line on the second screen 420B) on an electronic map displayed on the second screen 420B, the first screen 420A also displays the electronic map and the second traveling route (e.g. the dotted line on the first screen 420A) in real-time Referring to FIG. 4 again, the present invention also provides another preferred method according to the operations therein. The method includes: switching from a first video data path to a second video data path via the first switch 412A; the first processor 410A retrieving a first operation display data on the first screen 420A as a first interaction data; the first processor 410A converting this first interaction data into a first video communication signal; and the first processor 410A sending out the first video communication signal by the first transceiver device 450A, thereby the second screen 420B of the second communication apparatus 400B in the video communications displaying the first operation display data. The method may further include: switching from a third video data path to a fourth video data path via the first switch 412A; the second processor 410B retrieving a second operation display data on the second screen 420B as a second interaction data, wherein the second operation display data includes the first operation display data; the second processor 410B converting this second interaction data into a second video communication signal; and the second processor 410B sending out the second video communication signal by the second transceiver device 450B, thereby the first screen 420A of the first communication apparatus 400B in the video communications displaying the second operation display data. In this embodiment, the first and second screens 420A and 420B can be a first and a second touch screen.

In an example of the present invention, the above communication apparatuses are applicable to mobile phones, which use protocols such as 3G mobile communication protocol, WiMAX, LTE and etc. to perform video communications with other mobile communication apparatuses. For example, the above communication apparatus is built into a smart phone, and video communications are carried out with another mobile phone via a mobile communication network by calling.

In the prior art, mobile phones can exchange and playback video streams via the mobile communication network, for example, mobile phones at both ends in an established video communication can receive and playback sounds and images retrieved by the other. Images can be taken and provided by an image pickup device, such as a CCD or CMOS camera, on the mobile phone. Sounds can be retrieved by a microphone on the mobile phone. In addition, a mobile phone that receives a video stream can display the images in the video stream on its screen and play the sounds in the video stream through its speaker.

The mobile phone with the above communication apparatus can play images or pictures other than the images in the video stream on its screen. For example, the screen can play images or pictures executing one or more applications instead of the images in the video stream, or play the downsized images in the video stream on only part of the screen. At the same time, interaction between the user and an executed application in conjunction with the screen images during execution of the application can become the transmitted images of a video stream. In an example of the present invention, the transmitted images of a video stream include, but are not limited to, at least one or a combination of all of images during execution of the application, presentations of interactions with the executed application, images taken by the image pickup device.

For example, when a user A uses a mobile phone with the above communication apparatus to call a mobile phone without the above communication apparatus of a user B, during the call, user A executes a map software (e.g. Google maps), and manipulates the map software by touching while explaining by speaking. Although user B cannot execute the map software on the phone, he/she can see user A operating on the map software and listen to the audio explanation, thereby obtaining the interaction information conveyed by user A.

For example, user B may receive the map transmitted by user A and watch user A drawing the route on the map while listening to the user A's explanation so as to know how to get to the destination. Thus, the present invention allows information receiving end to more easily understand the video information accompanied by dynamic images provided by the information providing end without changing existing conditions of the phone, overcoming difficulties faced in traditional audio communications. In the process, the information receiving end may further inquire and express his/her understanding through voice call, so the information providing end can respond in real-time.

Moreover, if user B's mobile phone is also equipped with the above communication apparatus, then both user A and user B can see the interactions on each other's screens. For example, both execute the same application or master-slave applications, same background image can be display on both screens, they can both manipulate this background image, for example, pan, zoom in, zoom out, rotate, or twist the background image, or draw lines, paste pictures, or write characters as foreground images on the background image.

In an example of the present invention, the background image may also include synchronization information, which can exist in the form of codes, letters or patterns in the background image, either visible or invisible. For example, the synchronization information is displayed on the background image as barcode or 2D bar code, or hidden in the background image by specific algorithm like invisible ink, which can only be displayed or identified by performing the specific algorithm on the background image. Thus, the communication apparatuses in video communications can synchronize the background images with each other by specific synchronization information. For example, when user A pans a map, the application on the mobile phone of user B can sync the map displayed on its screen by identifying the synchronization information in the images of the video stream. As another example, the operations performed by the users can be represented by the synchronization information, so both communication apparatuses can display interactions of the other party on the screens through the images of the video stream.

Synchronization information can not only be used to sync screens and operation presentations, but also used to exchange information. In other words, both parties can exchange information based solely on images. The exchanged information can be displayed or hidden in a single frame of screen image or continuous screen images. In addition, information can be exchanged through the sounds in the video stream.

The rates charged for video calls and data transmissions may be different, and data transmission may require additional charges on one or both ends, and can be relatively more expensive. The present invention achieves data synchronization and/or exchange through video communications, and information receiving end can use a mobile phone that is only capable of video call but not executing the application that is being executed by the information transmitting end.

In an example of the present invention, the above mobile phone can be a tablet PC, a desktop computer, or a computer capable of video transmission and playing. For example, the above video stream can be transmitted by a computer or network phone via Internet or LAN, for example, by executing a messenger software or network phone software, or using hardware to achieve these software functions. Since the present invention allows reflections of operations on screens at both ends, in an example of the present invention, the application executed by the above communication apparatus can be game software, presentation software, document processing software or any other software that involves manual input of information.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A communication apparatus for real-time screen interaction in video communications, comprising:
a video communication module including:
a video output conversion device for generating a first video stream based on a sound input and a video input; and
a communication device for transmitting the first video stream and receiving a second video stream;
a sound retrieving module for providing a first sound signal as the sound input;
an input interface for receiving a user operation to generate at least one operation instruction;
a processor for generating a screen image based on the second video stream and at least one operation instruction; and
an image retrieving module, including:
an image pickup device for providing the video input by picking up images;
an image retrieving device for providing the video input based on the screen image; and
a switching device for selecting one of the image pickup device and the image retrieving device to provide the video input based on the at least one operation instruction.

2. The communication apparatus of claim 1, wherein the processor executes an application and generates the screen image based on the at least one operation instruction.

3. The communication apparatus of claim 1, wherein the sound retrieving module includes a microphone and the processor generates a second sound signal to a speaker based on the second video stream.

4. The communication apparatus of claim 1, wherein the input interface includes a touch screen and the screen image is displayed on the touch screen.

5. A communication method for real-time screen interaction in video communications, comprising:
generating a first video stream based on a sound input and a video input;
transmitting the first video stream and receiving a second video stream;
providing a first sound signal as the sound input;
receiving a user operation to generate at least one operation instruction;
generating a screen image based on the second video stream and at least one operation instruction; and
selecting an image taken by an image pickup device or the screen image as the video input based on the at least one operation instruction.

6. The communication method of claim 5, wherein the screen image is generated by a processor executing an application and based on the at least one operation instruction.

7. The communication method of claim 5, wherein the first sound signal sound is retrieved by a microphone and a processor generates a second sound signal to a speaker based on the second video stream.

8. The communication method of claim 5, wherein the user operates an input interface to generate the at least one operation instruction, the input interface includes a touch screen and the screen image is displayed on the touch screen.

9. A communication system for real-time screen interaction in video communications, comprising:
a communication network for providing transmission of a first video stream and a second video stream;
a first communication apparatus including:
a first video communication module including:
a first video output conversion device for generating the first video stream based on a first sound input and a first video input; and
a first communication device for transmitting the first video stream and receiving the second video stream via the communication network;
a first sound retrieving module for providing a first sound signal as the first sound input;
a first input interface for receiving a user operation to generate at least one operation instruction;
a first processor for generating a first screen image based on the second video stream and at least one operation instruction; and
a first image retrieving module, including:
an image pickup device for providing the first video input by picking up images;
an image retrieving device for providing the first video input based on the first screen image; and
a switching device for selecting one of the image pickup device and the image retrieving device to provide the first video input based on the at least one operation instruction; and
a second communication apparatus including:
a second video communication module including:
a second video output conversion device for generating the second video stream based on a second sound input and a second video input; and
a second communication device for transmitting the second video stream and receiving the first video stream via the communication network;
a second sound retrieving module for providing a second sound signal as the second sound input;
a second processor for generating a second screen image based on the first video stream; and
a second image retrieving module for providing the second video input by picking up images.

10. The communication system of claim 9, wherein the first processor executes an application and generates the first screen image based on the at least one operation instruction.

11. The communication system of claim 9, wherein the first sound retrieving module includes a first microphone and the first processor generates a third sound signal to a first speaker based on the second video stream, the second sound retrieving module includes a second microphone and the second processor generates a fourth sound signal to a second speaker based on the first video stream.

12. The communication system of claim 9, wherein the first input interface includes a touch screen and the first screen image is displayed on the touch screen.

* * * * *